US011926380B2

(12) United States Patent
Lapis et al.

(10) Patent No.: US 11,926,380 B2
(45) Date of Patent: Mar. 12, 2024

(54) METHOD FOR DETERMINING A STEERING SENSATION OF A STEER-BY-WIRE STEERING SYSTEM

(71) Applicants: thyssenkrupp Presta AG, Eschen (LI); thyssenkrupp AG, Essen (DE)

(72) Inventors: Leonard Lapis, Sennwald (CH); Manuel Rohrmoser, Thüringen (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 195 days.

(21) Appl. No.: 17/299,596

(22) PCT Filed: Dec. 17, 2019

(86) PCT No.: PCT/EP2019/085648
§ 371 (c)(1),
(2) Date: Jun. 3, 2021

(87) PCT Pub. No.: WO2020/127265
PCT Pub. Date: Jun. 25, 2020

(65) Prior Publication Data
US 2022/0097759 A1 Mar. 31, 2022

(30) Foreign Application Priority Data
Dec. 19, 2018 (DE) ...................... 10 2018 132 865.6

(51) Int. Cl.
*B62D 6/00* (2006.01)
(52) U.S. Cl.
CPC .................................. *B62D 6/008* (2013.01)
(58) Field of Classification Search
None
See application file for complete search history.

(56) References Cited

U.S. PATENT DOCUMENTS 5,719,565 A * 2/1998 Tsuno ................ B60G 17/0165
340/901
5,723,768 A * 3/1998 Ammon .................... G01P 3/48
73/146

(Continued)

FOREIGN PATENT DOCUMENTS

DE 10 2005 002 614 A 8/2006
DE 10 2015 216 040 A 2/2017
(Continued)

OTHER PUBLICATIONS

Misener, On-board road condition monitoring system using slip-based tyre-road friction estimation and wheel speed signal analysis, Proc. IMechE vol. 221 Part K: J. Multi-body Dynamics, 2007 (Year: 2007).*

(Continued)

*Primary Examiner* — Ryan Rink
(74) *Attorney, Agent, or Firm* — thyssenkrupp North America, LLC

(57) ABSTRACT

A method may be utilized to control a steer-by-wire steering system for a motor vehicle that includes an electronically controllable steering actuator that acts on steered wheels, a control unit, a feedback actuator to which a driver's request for a steering angle can be applied by a driver via steering input means and which outputs a feedback signal to the steering input means as a reaction to the driver's request and a driving condition of the motor vehicle, and a signal transmission that transmits the driver's request to the control unit. The control unit controls the steering actuator to convert the driver's request into deflection of the steered wheels. The method may involve determining wheel slip of a front wheel, performing frequency analysis of a profile over time of a wheel slip signal of the front wheel, and (Continued)

determining the feedback signal based on the result of the frequency analysis.

7 Claims, 2 Drawing Sheets

(56) References Cited

U.S. PATENT DOCUMENTS

| | | | | |
|---|---|---|---|---|
| 6,834,261 | B1* | 12/2004 | Andonian | B62D 5/006 |
| | | | | 703/7 |
| 2003/0220727 | A1* | 11/2003 | Husain | B62D 6/008 |
| | | | | 180/443 |
| 2004/0133324 | A1* | 7/2004 | Yasui | B60T 8/172 |
| | | | | 701/41 |
| 2006/0069523 | A1* | 3/2006 | Kanekawa | B60T 8/1725 |
| | | | | 702/84 |
| 2008/0015763 | A1* | 1/2008 | Kitazaki | B60C 23/064 |
| | | | | 73/146 |
| 2017/0305421 | A1* | 10/2017 | Sekizawa | B60T 7/12 |
| 2018/0105206 | A1* | 4/2018 | Gullven | B62D 6/02 |
| 2018/0345979 | A1* | 12/2018 | Abdossalami | B60W 40/064 |
| 2018/0362021 | A1* | 12/2018 | Imamura | B60W 10/06 |
| 2019/0031235 | A1* | 1/2019 | Lee | B62D 5/006 |
| 2019/0092384 | A1* | 3/2019 | Kodera | B62D 5/006 |
| 2019/0152515 | A1* | 5/2019 | Longuemare | B62D 6/008 |
| 2019/0184773 | A1* | 6/2019 | Saito | B60W 40/06 |
| 2019/0217886 | A1* | 7/2019 | Rohrmoser | B62D 5/0481 |
| 2019/0225227 | A1* | 7/2019 | Mori | G01C 7/02 |
| 2020/0023889 | A1* | 1/2020 | Rohrmoser | B62D 5/0463 |
| 2020/0346655 | A1* | 11/2020 | Suzuki | B60T 8/1725 |
| 2020/0361475 | A1* | 11/2020 | Moerbe | B60W 40/068 |
| 2022/0268577 | A1* | 8/2022 | Suzuki | B60C 11/246 |

FOREIGN PATENT DOCUMENTS

| | | |
|---|---|---|
| DE | 10 2016 005 013 A | 10/2017 |
| DE | 10 2017 105 370 A | 9/2018 |
| EP | 1 683 706 A | 7/2006 |
| EP | 2 647 548 A | 10/2013 |
| JP | H06206561 A | 7/1994 |
| JP | 2014148299 A | 8/2014 |

OTHER PUBLICATIONS

Furukawa, Advanced Estimation Techniques of Road Surface Condition and Their Experimental Evaluation using Test Electric Vehicle "UOT March I and II", (Year: 2003).*

English Translation of International Search Report issued in PCT/EP2019/085648 dated Mar. 26, 2020.

* cited by examiner

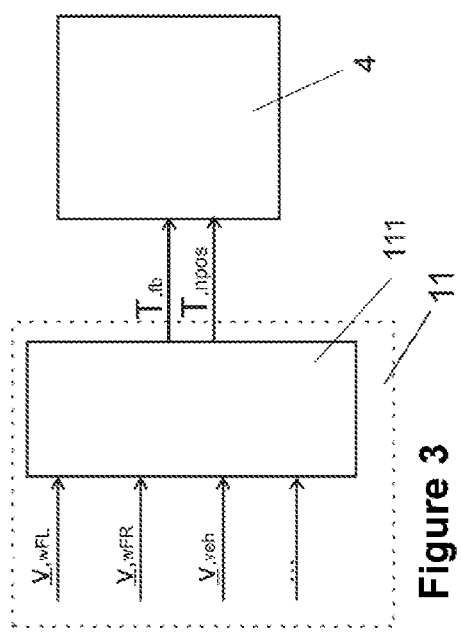
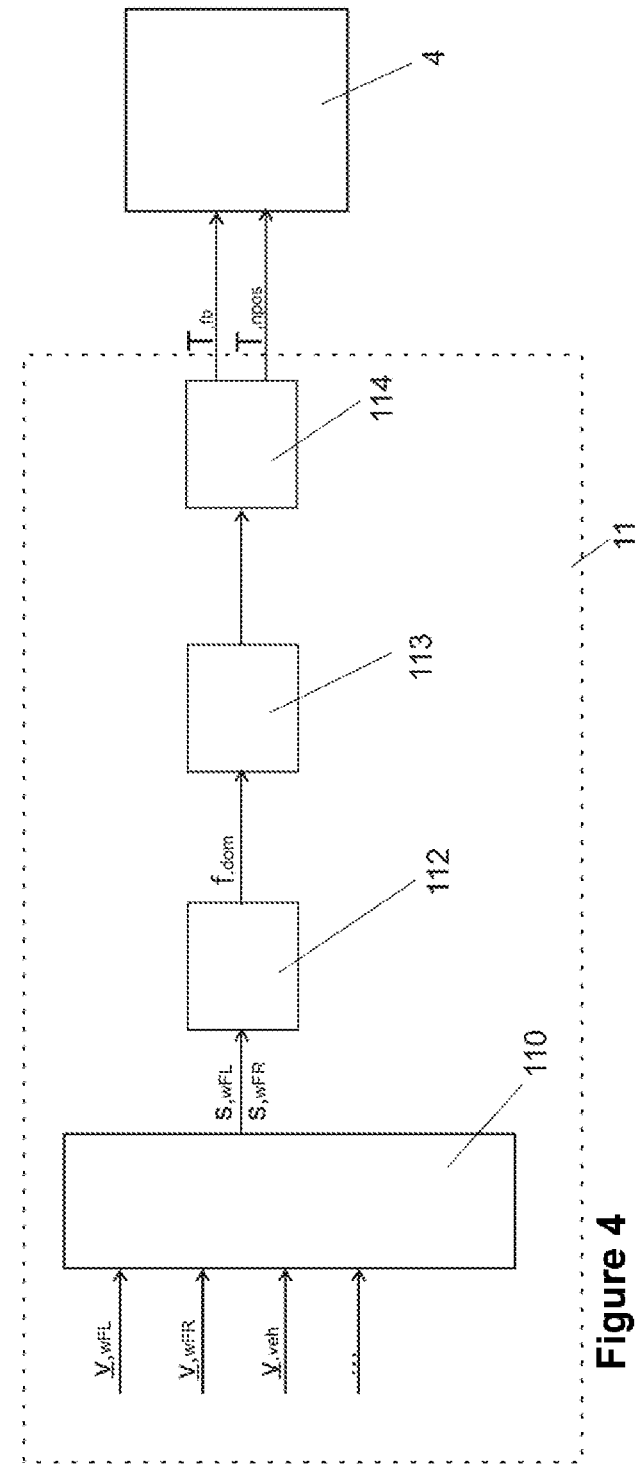

METHOD FOR DETERMINING A STEERING SENSATION OF A STEER-BY-WIRE STEERING SYSTEM

CROSS REFERENCE TO RELATED APPLICATIONS

This application is a U.S. National Stage Entry of International Patent Application Serial Number PCT/EP2019/085648, filed Dec. 17, 2019, which claims priority to German Patent Application No. DE 10 2018 132 865.6, filed Dec. 19, 2018, the entire contents of both of which are incorporated herein by reference.

FIELD

The present disclosure generally relates to steer-by-wire steering systems and methods for controlling such steer-by-wire steering systems.

BACKGROUND

In steer-by-wire steering systems, the position of the steered wheels is not coupled directly with the steering input means, for example a steering wheel. There is a connection between the steering wheel and the steered wheels via electrical signals. The driver's steering intention is picked up by a steering angle sensor and, in dependence on the driver's steering request, the position of the steered wheels is controlled via a steering actuator. A mechanical connection to the wheels is not provided, so that a direct force feedback is not transmitted to the driver after actuation of the steering wheel. However, a correspondingly adapted feedback, for example when parking or when driving straight ahead, in which a steering torque that is adapted to the vehicle reaction and differs according to the vehicle manufacturer is desirable as the force feedback. During cornering, reaction forces act on the steering gear as transverse forces, which are reproduced by the feedback actuator in the form of a torque contrary to the steering direction. The driver experiences a steering feel which can thereby be preset. In order to simulate the feedback from the road on the steering wheel in the case of steer-by-wire steering systems, it is necessary to provide a feedback actuator (FBA) on the steering wheel or the steering column, which feedback actuator imparts a steering feel to the steering handling in dependence on the desired feedback.

The feedback properties of the steering system are conventionally determined by the steering rack force, which acts on the steering rack from the tie rods, which are connected to the wheels via the chassis. The steering rack force is significantly influenced by the prevailing cornering forces. A substantial part of the prevailing steering rack force thus corresponds to a transverse acceleration. However, the steering rack force is not only determined by the lateral forces that occur when traveling around a corner, but the steering rack force is also influenced by a large number of other parameters of a prevailing driving situation. An example of such a parameter is the road condition (irregularities, track grooves, coefficient of friction).

It is known in the case of electric power steering (EPS) to determine the prevailing steering rack force that is present by means of a torque sensor arranged on the steering rack or by estimation by means of a so-called observer based on a model of the steering system. Laid-open document DE 10 2015 216 040 A1 discloses an electromechanical power steering system in which a steering rack force is determined and the profile thereof over time is studied and compared with a reference value in order subsequently to provide the driver with haptic feedback, for example in the form of a steering torque imparted to a steering wheel.

Thus, a need exists for a method for controlling a steer-by-wire steering system for motor vehicles which permits an improved steering feel and at the same time exhibits low-interference behavior in the middle range. Furthermore, a need exists for a steer-by-wire steering system which permits improved steering behavior.

Advantageous further developments of the invention are mentioned in the dependent claims.

BRIEF DESCRIPTION OF THE FIGURES

FIG. 3 is a block diagram of the module for determining the steering torque.

FIG. 4 is a block diagram of another example module for determining the steering torque.

DETAILED DESCRIPTION

Figure 1:
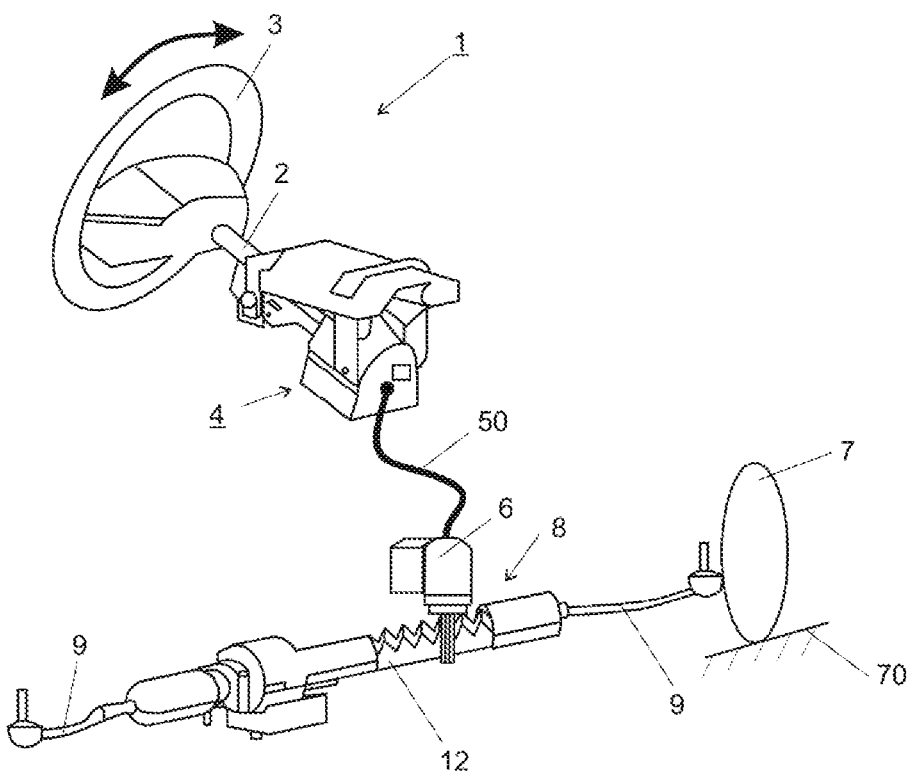
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for controlling a steer-by-wire steering system for a motor vehicle comprises:
   an electronically controllable steering actuator which acts on the steered wheels,
   a control unit,
   a feedback actuator to which a driver's request for a steering angle can be applied by a driver via a steering input means and which outputs a feedback signal to the steering input means as a reaction to the driver's request and a driving condition of the motor vehicle,
   a signal transmission which transmits the driver's request to the control unit,
   wherein the control unit controls the steering actuator in order to convert the driver's request into a deflection of the steered wheels, wherein the method comprises the following method steps:
   determination of the wheel slip of at least one front wheel,
   frequency analysis of the profile over time of the wheel slip signal of the at least one front wheel,
   determination of the feedback signal in dependence on the result of the frequency analysis.

The feedback signal can preferably be determined by the following steps:
- generation of a transmission model from a vehicle velocity vector and from in each case a vector of a front wheel velocity of a left and of a right front wheel,
- outputting of a steering torque to the feedback actuator, which imparts to the steering wheel the feedback from the road to the driver.

By determining the feedback signal from the velocity vectors, it is possible to transmit to the driver a stable signal about the road condition that is independent of forces which result from the mechanical components of the steering actuator and are transmitted to the driver in the form of a torque and which in turn lead via the control unit to an undesirable deflection at the steering rod of the steering actuator.

In the frequency analysis there are preferably determined dominant frequencies which are classified by means of predefined frequency values. The dominant frequencies are preferably determined in a frequency range of from 2 to 50 Hz, the dominant frequencies are more preferably determined in a frequency range of from 8 to 20 Hz.

A predefined feedback signal is preferably allocated to the dominant frequencies in dependence on the classification.

The feedback signal preferably comprises a steering torque and a center position.

It is further preferred that the wheel slip of at least one front wheel $s_{,wF}$ is determined in accordance with the following equation:

$$s_{wF} = \frac{(v_{,wF} - v_{,veh})}{v_{,veh}},$$

wherein $v_{,wF}$ is the front wheel velocity of at least one front wheel and $v_{,veh}$ is the vehicle velocity.

The wheel slip of both front wheels is preferably analyzed.

There is further provided a steer-by-wire steering system for a motor vehicle comprising:
- an electronically controllable steering actuator which acts on the steered wheels, a control unit, a feedback actuator to which a driver's request for a steering angle can be applied by a driver via a steering input means and which outputs a feedback signal to the steering input means as a reaction to the driver's request and a driving condition of the motor vehicle,
- a device for signal transmission which transmits the driver's request to the control unit,
- wherein the control unit controls the steering actuator in order to convert the driver's request into a deflection of the steered wheels, wherein the steer-by-wire steering system is adapted to carry out a described hereinbefore.

Figure 2:
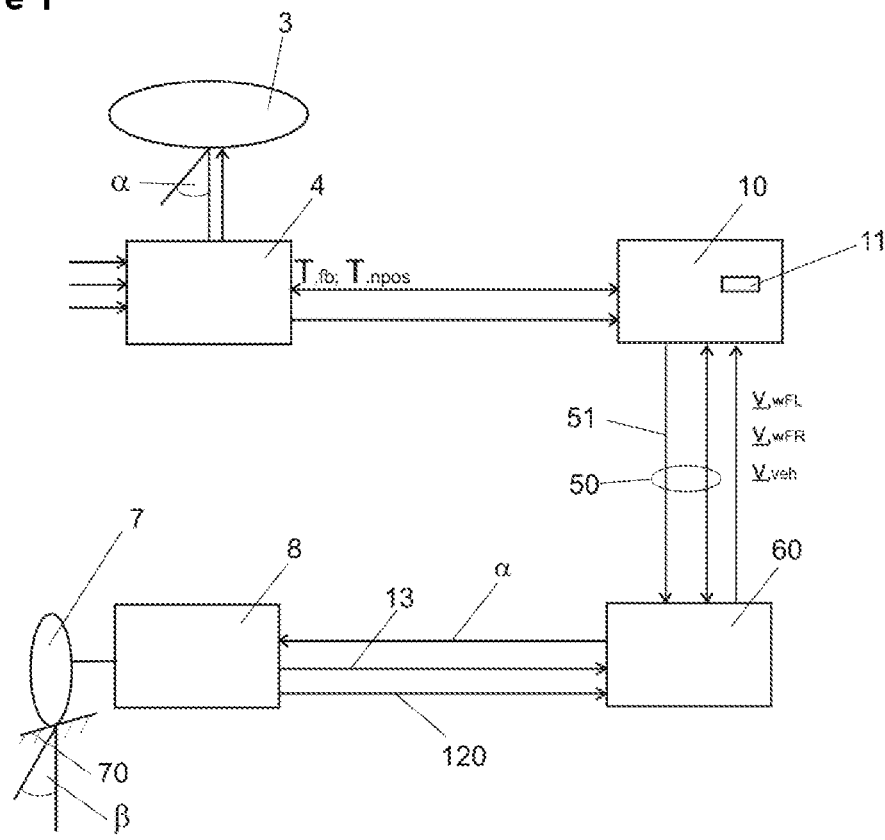
FIG. 2 is a block diagram of a control system of a steer-by-wire steering system with an example module for determining a steering torque.

FIG. 1 shows a steer-by-wire steering system 1. An angle of rotation sensor, not shown, is mounted on a steering shaft 2, which angle of rotation sensor detects the driver steering angle applied by turning a steering input means 3, which in the example is in the form of a steering wheel. A steering torque can, however, additionally be detected. A joystick can serve as the steering input means. There is further mounted on the steering shaft 2 a feedback actuator 4, which serves to simulate the feedback from the road 70 onto the steering wheel 3 and thus to provide the driver with feedback about the steering and driving behavior of the vehicle. The driver's steering request is transmitted via the angle of rotation a of the steering shaft 2 measured by the angle of rotation sensor via signal lines to a feedback actuator monitor unit 10, as is illustrated in FIG. 2. The feedback actuator monitor unit 10 transmits the driver's steering request to the control unit 60. The feedback actuator monitor unit 10 preferably also assumes control of the feedback actuator 4. The feedback actuator monitor unit 10 can also be formed integrally with the control unit 60. In dependence on the signal of the angle of rotation sensor and further input parameters, the control unit 60 controls an electrical steering actuator 6, which controls the position of the steered wheels 7. The steering actuator 6 acts indirectly on the steered wheels 7 via a steering rod steering gear 8, such as, for example, a steering rack steering gear, and via tie rods 9 and other components.

FIG. 2 shows a control system of the feedback actuator 4. The feedback actuator 4 receives signals via the signal line 50 inter alia from the angle of rotation sensor, which measures and stores the angle of rotation a, the steering angle acceleration and the steering angle velocity. The feedback actuator 4 communicates with the feedback actuator monitor unit 10, which controls the feedback actuator 4. The feedback actuator monitor unit 10 receives from a control unit 60 of the steering actuator 6 the actual wheel steering angle θ of the steered wheels 7 and also further parameters which the control unit 60 has determined. The steering rack position 120 measured at a steering rack 12 and further road information 13 are passed to the control unit 60. The control unit 60 further receives driver-related steering commands 51, such as the steering angle status. The feedback actuator monitor unit 10 has a module for determining a steering feel 11. The module generates a signal which controls the feedback actuator 4 and results in a steering torque $T_{,fb}$ which generates a steering feel. In addition, a steering torque for the straight-ahead position of the steering wheel $T_{,npos}$ is transmitted to the feedback actuator 4.

FIG. 3 shows a module for determining the steering feel 11. In a first step 111, the steering torque for the straight-ahead position of the steering wheel $T_{,npos}$ is determined from the vectors of the road wheel velocities of the two front wheels $v_{,wFL}$, $v_{,wFR}$, and of the vehicle velocity $v_{,veh}$ by means of a frequency analysis or via a transmission model, for example a bandpass filter, and is imprinted onto the resulting steering torque $T_{,fb}$ and transmitted to the feedback actuator 4. By using the road wheel velocities and the vehicle velocity, a stable steering torque can be fed back to the driver, which steering torque is independent of forces acting on the steering gear which result from the mechanical components of the steering actuator and are transmitted to the driver in the form of a torque and which in turn lead via the control unit to an undesirable deflection at the steering rod of the steering actuator.

FIG. 4 shows a further model for determining the steering feel 11. In a first step 110, the wheel slip of the two front wheels $s_{,wFL}$, $s_{,wFR}$ is determined from the vectors of the road wheel velocities of the two front wheels $v_{,wFL}$, $v_{,wFR}$, and of the vehicle velocity $v_{,veh}$ by means of the following relationships:

$$s_{,wFL} = \frac{(v_{,wFL} - v_{,veh})}{v_{,veh}}, \quad s_{,wFR} = \frac{(v_{,wFR} - v_{,veh})}{v_{,veh}}.$$

On the basis of the wheel slip of the two front wheels $s_{,wFL}$, $s_{,wFR}$ it can be determined whether the vehicle is traveling on a flat/dry road or, for example, on a wet road or a gravel path. If the vehicle is traveling, for example, on a gravel path, the wheel slip of the two front wheels $s_{,wFL}$, $s_{,wFR}$ oscillates, so that these irregularities can be determined by analyzing the values. In a next step 112, therefore, a frequency analysis of the wheel slip of the two front wheels $s_{,wFL}$, $s_{,wFR}$ is carried out. In the frequency analysis, an oscillation of the profile of the wheel slip over time is preferably analyzed in the range of approximately from 2 to 50 Hz, in particular in the range of approximately from 8 to 20 Hz, and frequencies, or dominant frequencies, are determined therefrom. The determined dominant frequencies $f_{,dom}$ are compared in a next step 113 with predefined frequency values. The determined dominant frequencies $f_{,dom}$ are thereby allocated to specific frequency ranges on the basis of cause and are forwarded as frequency ranges that are to be evaluated as desirable or are suppressed or at least strongly attenuated in a feedback path as frequency ranges that are perceived to be interfering. On the basis of the forwarded dominant frequencies, a value for the steering torque $T_{,fb}$ is generated in a next step 114, in order to provide to the driver a steering feel that is as realistic as possible, based on the road information. Furthermore, a steering torque for the straight-ahead position of the steering wheel $T_{,npos}$ is transmitted to the feedback actuator 4. The steering torques so determined are of low interference, since they are dependent only on the measurement of the velocities and accordingly are wholly independent of the steering rack force.

What is claimed is:

1. A method for controlling a steer-by-wire steering system for a motor vehicle that includes an electronically controllable steering actuator that acts on steered wheels, a control unit, a feedback actuator to which a driver request for a steering angle can be applied by a driver via a steering input means and which outputs a feedback signal to the steering input means as a reaction to the driver request and to a driving condition of the motor vehicle, and a signal transmission that transmits the driver request to the control unit, wherein the control unit controls the electronically controllable steering actuator to convert the driver request into a deflection of the steered wheels, the method comprising:

determining a wheel slip of a front wheel of the steered wheels;
   performing frequency analysis of a profile over time of a wheel slip signal of the front wheel, wherein performing the frequency analysis comprises classifying dominant frequencies via predefined frequency values, and allocating a predefined feedback signal to the dominant frequencies based on the classification; and
   determining the feedback signal based on a result of the frequency analysis.

2. The method of claim 1 wherein the feedback signal comprises a steering torque and a center position.

3. The method of claim 1 wherein the wheel slip ($S_{,wF}$) is determined based on the following equation:

$$S_{,wF} = \frac{(V_{,wF} - V_{,veh})}{V_{,veh}},$$

wherein $V_{,wF}$ is a front wheel velocity of the front wheel and $V_{,veh}$ is a velocity of the motor vehicle.

4. The method of claim 3 wherein performing the frequency analysis comprises classifying dominant frequencies via predefined frequency values, wherein the dominant frequencies are determined in a frequency range of from 8 to 20 Hz.

5. The method of claim 1 wherein the front wheel is a first front wheel, the method comprising:

determining a wheel slip of a second front wheel of the steered wheels;
   performing frequency analysis of a profile over time of a wheel slip signal of the second front wheel; and
   determining the feedback signal based on a result of the frequency analysis for the second front wheel.

6. A steer-by-wire steering system for a motor vehicle comprising:

an electronically controllable steering actuator that acts on steered wheels;
   a control unit;
   a feedback actuator to which a driver request for a steering angle can be applied by a driver via a steering input means and which outputs a feedback signal to the steering input means as a reaction to the driver request and to a driving condition of the motor vehicle; and
   a device for signal transmission that transmits the driver request to the control unit,
   wherein the control unit controls the steering actuator to convert the driver request into a deflection of the steered wheels,
   wherein the steer-by-wire steering system is configured to
      determine a wheel slip of a front wheel of the steered wheels;
      perform a frequency analysis of a profile over time of a wheel slip signal of the front wheel, wherein performing the frequency analysis comprises classifying dominant frequencies via predefined frequency values, and allocate a predefined feedback signal to the dominant frequencies based on the classification; and
      determine the feedback signal based on a result of the frequency analysis.

7. The method of claim 1, wherein the dominant frequencies are determined in a frequency range of from 2 to 50 Hz.

* * * * *